US007738230B2

(12) United States Patent
Mallon et al.

(10) Patent No.: US 7,738,230 B2
(45) Date of Patent: Jun. 15, 2010

(54) NONVOLATILE STATUS INDICATOR SWITCH

(75) Inventors: Robert C. Mallon, Buena Park, CA (US); Imtiaz Khan, Trabuco Canyon, CA (US)

(73) Assignee: Leach International Corporation, Buena Park, CA (US)

( * ) Notice: Subject to any disclaimer, the term of this patent is extended or adjusted under 35 U.S.C. 154(b) by 51 days.

(21) Appl. No.: 11/969,861

(22) Filed: Jan. 4, 2008

(65) Prior Publication Data

US 2009/0174981 A1 Jul. 9, 2009

(51) Int. Cl.
*H02H 3/00* (2006.01)

(52) U.S. Cl. ........................................ 361/114; 361/42

(58) Field of Classification Search ............ 361/42–50, 361/114

See application file for complete search history.

(56) References Cited

U.S. PATENT DOCUMENTS 3,614,533 A * 10/1971 Douglas et al. ............... 361/44
7,007,179 B2 * 2/2006 Mares et al. ................ 713/310
2004/0070897 A1 4/2004 Wu et al.
2004/0145840 A1 7/2004 Langford et al.
2005/0018371 A1 * 1/2005 Mladenik et al. .............. 361/78
2005/0083617 A1 4/2005 Blumenauer et al.
2005/0286184 A1 12/2005 Campolo
2007/0201170 A1 8/2007 Hooper
2007/0291428 A1 12/2007 Bax et al.

OTHER PUBLICATIONS

Ramtron International Corporation; "FM 1105: *Nonvolatile 5V Dual State Saver*" Data Sheet Rev. 1.0 May 2007, pp. 1-8.
International Search Report for Application No. PCT/US08/50321 filed Jan. 4, 2008, dated Jun. 14, 2008, mailed Jun. 27, 2008, 2 pages.
Written Opinion for Application No. PCT/US08/50321 filed Jan. 4, 2008, dated Jun. 20, 2008, mailed Jun. 27, 2008, 5 pages.

* cited by examiner

*Primary Examiner*—Danny Nguyen
(74) *Attorney, Agent, or Firm*—Christie, Parker & Hale, LLP

(57) ABSTRACT

A non-volatile status indicator switch is provided. In one embodiment, the invention relates to an aircraft electrical system including a fault detection circuit coupled to a relay, and a fault indicator circuit coupled to the fault detection circuit and to a control input of the relay, wherein the fault indicator circuit includes a nonvolatile memory element, wherein the fault detection circuit is configured to detect a fault and to provide a signal indicative of the fault to the fault indicator circuit, and wherein the fault indicator circuit is configured to respond to the signal indicative of the fault by providing a predetermined control signal to the relay and by storing information indicative of the detection of the fault in the nonvolatile memory element.

20 Claims, 11 Drawing Sheets

NONVOLATILE STATUS INDICATOR SWITCH

BACKGROUND OF THE INVENTION

The present invention relates generally to the use of relays in aircraft electrical systems and more particularly to systems and methods for saving and indicating the status of a detected fault in the relays.

The primary functions of an aircraft electrical system are to generate, regulate and distribute electrical power throughout the aircraft. There are several different power sources on an aircraft that are used to supply power to aircraft electrical systems. These power sources can include engine driven AC generators, auxiliary power units, external power and ram air turbines. Aircraft electrical components operate on many different voltages levels using both AC and DC. However, most of the aircraft systems use 115V AC at 400 Hz or 28V DC. Further, 26V AC is also used in some aircraft for lighting purposes. DC power is generally provided by "self-exciting" generators containing electromagnets, where the power is generated by a commutator which regulates the output voltage of 28V DC. AC power, normally at a phase voltage of 115V, is generated by an alternator, generally in a three-phase system and at a frequency of 400 Hz.

Relays are commonly used in aircraft electrical systems to control the supply of power to various loads. A typical relay includes contacts that connect to a power supply and contacts that connect to a load. Electromechanical contacts are closed by a magnetic field generated by a coil. The coil is energized by a control current provided to the relay via a control input. Contact closure allows load current to flow.

Faults in aircraft electrical systems can be dangerous. In particular, faults in electrical loads such as fuel pumps can result in explosions. Examples of faults that can occur in an aircraft electrical system include ground faults (short circuit to ground) and arc faults (shorts between the power lines). Ground faults result in a net current imbalance, while arc faults do not.

Various fault interrupters are used for the aircraft electrical systems. These fault interrupters can include a universal fault interrupter (UFI), an arc fault circuit interrupter (AFCI), and thermally tripped circuit breakers (CBs) now commonly installed in cockpits.

SUMMARY OF THE INVENTION

The invention relates to a non-volatile status indicator switch. In one embodiment, the invention relates to an aircraft electrical system including a fault detection circuit coupled to a relay, and a fault indicator circuit coupled to the fault detection circuit and to a control input of the relay, wherein the fault indicator circuit includes a nonvolatile memory element including a potentiometer having a nonvolatile memory, wherein the fault detection circuit is configured to detect a fault and to provide a signal indicative of the fault to the fault indicator circuit, and wherein the fault indicator circuit is configured to respond to the signal indicative of the fault by providing a predetermined control signal to the relay and by storing information indicative of the detection of the fault in the nonvolatile memory.

In another embodiment, the invention relates to method for controlling a relay in an airplane electrical system, the method including detecting at least one fault, storing a record of the at least one fault using a potentiometer comprising a solid state nonvolatile memory, maintaining the record of the at least one fault in the absence of power, clearing the record of the at least one fault when a reset signal is received, and opening a relay to stop a flow of current to a load in the airplane electrical system when the at least one fault is stored.

In yet another embodiment, the invention relates to a fault indicator circuit including an input logic circuit configured to receive a fault signal indicative of a detection of a fault and a reset signal indicative of a request to reset the fault, and an electromechanical switch coupled to an output of the input logic circuit, where the output of the input logic circuit is derived from the fault signal and the reset signal, wherein the electromechanical switch is configured to control a relay in response to the output of the input logic circuit, and wherein an exterior housing of the electromechanical switch is surrounded by a shielding material that reduces an impact of external magnetic fields on operation of the electromechanical switch.

DETAILED DESCRIPTION OF THE INVENTION

Figure 1:
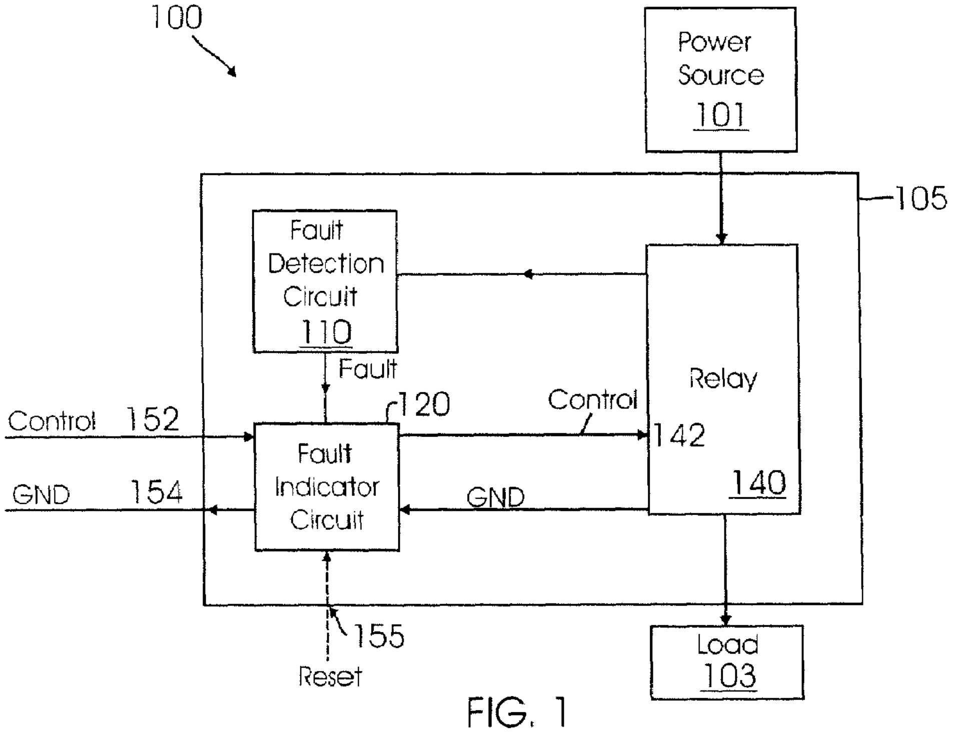
FIG. 1 is a schematic view of an aircraft electrical system in accordance with an embodiment of the present invention.

Referring now to the drawings, embodiments of fault indicator circuits in accordance with the present invention are illustrated that can be included in a relay for use in an aircraft electrical system. The fault indicator circuits can be used to interrupt a control signal provided to the relay in the event that a fault condition is detected. The interruption of the control signal can cause the relay to disconnect power from a load. In several embodiments of the present invention, the fault indicator circuit includes a nonvolatile memory for storing information indicative of the existence of a fault. When power is removed from the fault indicator, the nonvolatile memory preserves the fault status information. When power is restored to the relay, the fault indicator circuit can prevent the relay from being activated until the fault is cleared and the monitored device is manually reset.

In a number of embodiments, the fault indicator circuit is implemented using solid state circuit components. For example, a variety of solid state nonvolatile memory elements can be used to store fault status. In other embodiments, the fault indicator circuit is implemented using an electromechanical switch. Electromagnetic shielding material can be used to shield the electromechanical switches from interference from magnetic fields.

Solid state and electromechanical fault indicator circuits are each typically provided with a signal indicative of the detection of a fault from a fault detection circuit that monitors the relay with which the fault indicator switch is associated. The fault indicator, in turn, both stores the fault in its non-volatile memory and interrupts control of the relay in response to the fault. Fault indicator circuits in accordance with embodiments of the invention also include reset mechanisms that can be used to clear the non-volatile memories. For solid state fault indicator circuits, the reset mechanism can include a reset signal that prompts the nonvolatile memory to clear a stored fault. For electromechanical fault indicator switches, the reset mechanism can include changing the physical position of a electromechanical switch, for example, by pressing a button.

Many embodiments of fault indicator circuits include sensory indicators for alerting an operator or a maintenance person to the existence of a fault. The sensory indicators can include visual or audio indicators. Embodiments of solid state fault indicator circuits can include light emitting diodes (LEDs) as visual indicators. Embodiments of fault indicator circuits that use electromechanical switches can include pop-up buttons indicative of the presence of a fault.

FIG. 1 is a schematic view of an aircraft electrical system 100 in accordance with an embodiment of the present invention. The aircraft electrical system 100 includes a power source 101 that is coupled to a load 103 through a fault protected relay 105. The fault protected relay includes a fault detection circuit 110 that is coupled to a fault indicator circuit 120 and a relay 140. The fault indicator circuit 120 is coupled also to the relay 140. The fault protected relay 105 includes an external control input 152, a ground input 154, and a reset input 155.

The relay 140 controls the flow of power from a source to a load. The relay is generally controlled by the external control signal provided at the control input 152. During ordinary operation, the fault indicator circuit 120 passes the external control signal to a relay control input 142. In the event that the fault detection circuit detects a fault, the fault indicator circuit 120 can interrupt operation of the relay by ignoring the external control signal and instead providing a signal to the relay control input that opens the relay circuit.

In the illustrated embodiment, the fault detection circuit 110 monitors the relay for indications of faults in the aircraft electrical system. Fault detection circuits in accordance with the present invention can detect one or more of a variety of different faults. In the event that the fault detection circuit 110 detects a fault, the fault detection circuit provides a fault signal to the fault indicator circuit 120. The fault signal includes information indicative of the presence or absence of a presently occurring fault.

In the event that a fault is detected by the fault detection circuit 110, the fault indicator circuit 120 interrupts the signal that controls the relay 140 and stores the fault in a nonvolatile memory. The nonvolatile memory preserves the existence of the fault in the event that power is lost. In several embodiments, a reset signal is used to clear a fault from the nonvolatile memory. The reset signal can be provided by aircraft maintenance personnel following verification that the relay circuit is ready for safe operation.

The relay 140 can be implemented using any type of commercially available relay or a relay specifically designed for a particular aircraft electrical system 100. The fault indicator circuit 120 can be implemented using a logic circuit or microprocessor that is coupled to an indicator. In many embodiments, the indicator is a light emitting diode (LED) or another type of visual indicator such as a pop-up switch. The fault detection circuit 110 can be implemented using current imbalance detection circuits such as ground fault detection and/or arc fault detection circuits. Other appropriate circuits include overcurrent detection circuits and more sophisticated circuits such as circuits that detect faults using current and/or power profiles. In many instances, the fault detection circuit can be implemented using any circuit capable of detecting abnormal operation within the aircraft electrical system 100.

Figure 2:
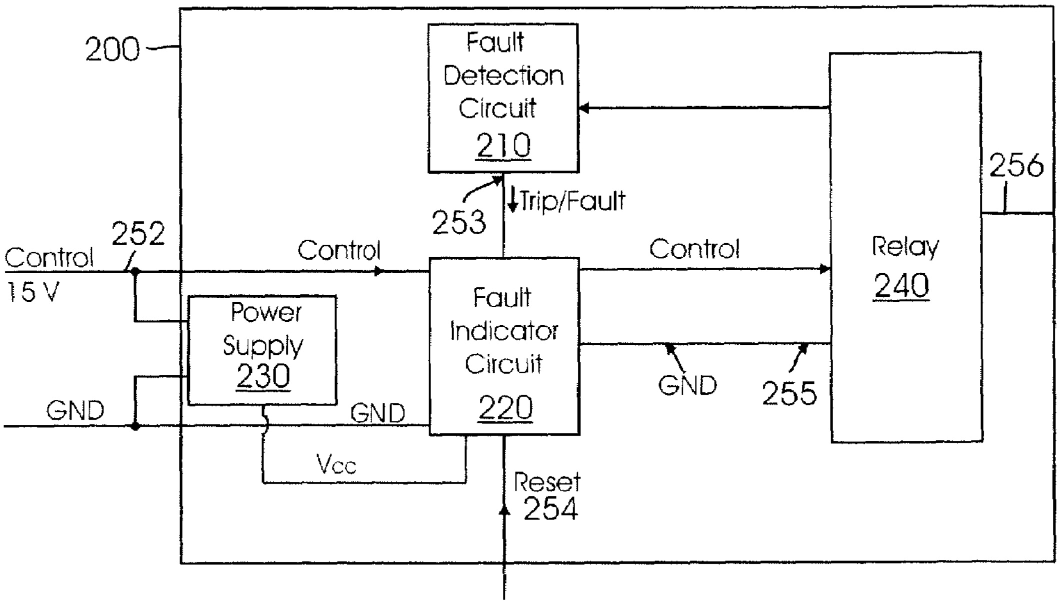
FIG. 2 is a schematic view of a fault protected relay in accordance with an embodiment of the present invention.

FIG. 2 is a schematic view of a fault protected relay 200 in accordance with an embodiment of the present invention. The fault protected relay 200 includes a fault detection circuit 210, a fault indicator circuit 220, a power supply 230 and a relay 240. A control line 252 is coupled to the fault protected relay 200 that carries a control signal to the fault protected relay. An output 256 of the fault protected relay 200 is coupled to a load (not shown). The fault detection circuit 210 is coupled to the fault indicator circuit 220 and the relay 240. The relay 240 is also coupled to the fault indicator circuit 220. The power supply 230 is coupled to the control line 252 carrying the control signal, the ground 255, and the fault indicator circuit 220.

The fault protected relay 200 operates similarly to the relay 105 of FIG. 1 and controls the flow of power from a power source to a load using the relay 240. The relay 240 receives an external control signal via the fault indicator circuit 220. The current flowing through the relay is monitored by the fault detection circuit 210 which provides a signal indicative of the fault status via output 253 to the fault indicator circuit 220. When a fault is detected, the fault indicator circuit 220 generates a control signal that inhibits relay 240 from providing power to the load.

In many embodiments, the fault indicator circuit 220 controls the operation of the relay 240 by opening or closing a current loop that energizes the relay coil. The fault indicator circuit is configured to receive a signal indicative of a fault from the fault detection circuit. Depending on the absence or presence of a fault, the fault indicator circuit completes or interrupts the current loop. In several embodiments, the fault indicator circuit completes the current loop in the absence of a fault. The external control signal 252 also controls the operation of relay. The external control signal can be generated in response to a pilot attempting to turn on an electrical component of the aircraft that is being controlled by the relay. Upon detection of a fault, the fault indicator circuit interrupts the current loop. In several embodiments, the fault indicator circuit provides a predetermined control signal as a substitute for the external control signal. The fault indicator circuit continues to provide the predetermined control output signal until it receives reset instructions. The reset signal 254 can be provided by a maintenance person that has verified that the relay circuit is ready for safe operation. In one embodiment, the reset signal is provided by another circuit.

The power supply 230 provides power to the components used in the fault indicator circuit 220. The power supply receives a relatively small amount of current from the external control signal 252 and provides that power to the fault indicator circuit.

The relay 240 and the fault detection circuit 210 can be implemented using any type of commercially available or specifically designed circuitry in accordance with known principles. Circuitry that can be used to implement a fault indicator circuit in accordance with embodiments of the invention are discussed below.

Figure 3:
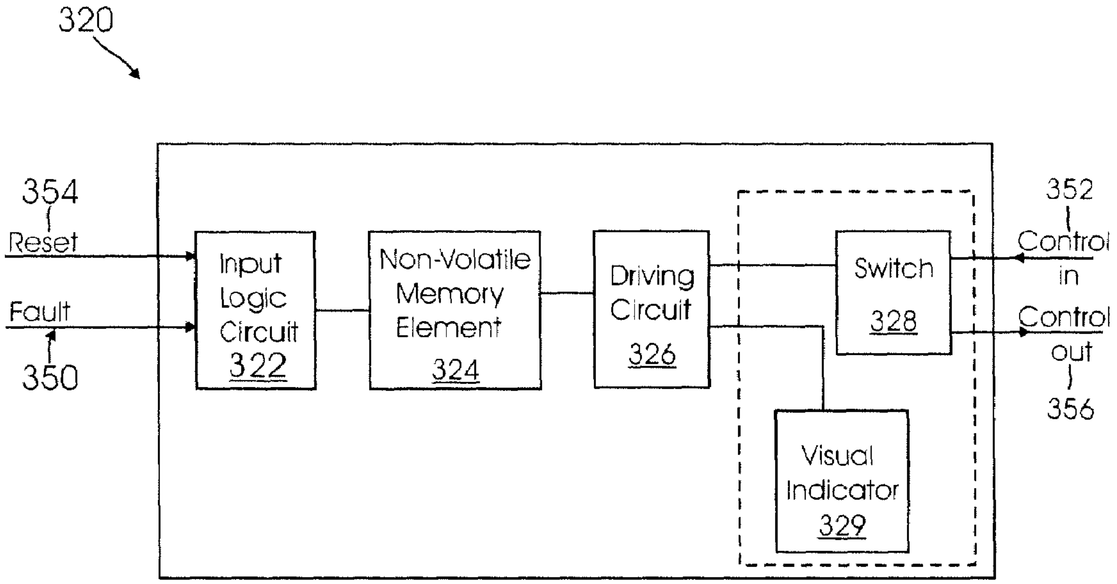
FIG. 3 is a schematic view of a fault indicator circuit in accordance with an embodiment of the present invention.

FIG. 3 is a schematic view of a fault indicator circuit 320 in accordance with an embodiment of the present invention. The fault indicator circuit 320 includes an input logic circuit 322, a nonvolatile memory element 324, and a driving circuit 326 coupled together in series. The fault indicator circuit also includes a switch 328 and a visual indicator 329 that are both coupled to the driving circuit 326. Fault 350 and reset 354 inputs to the fault indicator circuit are provided to the input logic circuit 322. A control input 352 and a control output 356 of the fault indicator switch are connected to the switch 328.

The fault indicator circuit 320 is configured to receive a fault signal from the fault input 350, a reset signal from the reset input 354, and a control-in signal from a control input 352 and to output a control-out signal via a control output 356. Depending on the values of the input signals the fault indicator circuit 320 can determine that a fault is present, visually indicate the existence of such fault, and/or open the relay. These operations are described in further detail below.

In the illustrated embodiment, the input logic circuit 322 is coupled to lines that provide reset and fault signals. The fault signal is indicative of the existence of a present fault. The reset input 354 provides a reset signal that indicates that the memory of the fault indicator circuit 320 should be cleared of any record indicative of a previous fault. The input logic circuit 322 uses these signals to determine whether or not a present fault is being reported and whether a past fault should remain or be cleared in the memory. The output of the input logic circuit 322 is provided to the nonvolatile memory element 324 which is configured to provide signals indicative of the fault status of the system.

The nonvolatile memory element 324 stores the fault status of the system and responds to signals received from the input logic circuit 322. The nonvolatile character of the nonvolatile memory element permits this element to maintain the fault status in the absence of power. As a result, once the existence of a fault is saved in the nonvolatile memory, the nonvolatile memory element 324 continues to indicate the existence of the fault to the downstream elements of the fault indicator circuit 320. The fault status stored in the nonvolatile memory element is determined by signals received by the input logic circuit 322. If the input logic circuit indicates to the nonvolatile memory element that a fault saved in the memory should be reset, then the nonvolatile memory element clears any saved fault. The no-fault status is maintained and communicated to the down-stream elements of the fault indicator circuit 320 until the input logic circuit 322 subsequently indicates that a fault has been detected.

The driving circuit 326 receives a signal indicating the presence or absence of a fault from the nonvolatile memory element 324. This signal can represent a present fault or a former unresolved fault. The driving circuit 326 responds to the existence of a fault by providing an input to the switch 328 that prevents the control input signal from being provided on the control output line. In addition, the driving circuit indicates the existence of the fault by activating the visual indicator 329. In several embodiments, the receipt of a reset input by the fault indicator circuit 320 results in the driving circuit 326 deactivating the visual indicator and closing the switch 328 to pass the signal on the control input line to the control output line. In other embodiments, the visual indicator is manually reset. In several embodiments, the reset input is provided to the fault indicator circuit 320 when the visual indicator is manually reset.

The switch 328 is turned on and off based on the signal received from the driving circuit 326. The switch 328 is coupled to control lines that carry a control-in signal to the switch and a control-out signal from the switch. The switch 328 is configured to open or close a circuit between the control input 352 and the control output 356. In short, the switch can interrupt the control signal. When the control output is connected to the control input of a relay, the absence of the control signal can cause the relay to open and prevent the flow of current from the source to the load.

As discussed above, the visual indicator 329 can be activated and deactivated by signals received from the driving circuit 326. The nonvolatile memory element stores the fault, and the output of the driving circuit 326 activates the visual indicator to indicate the existence of a fault to an operator. In the illustrated embodiment, the driving circuit 326 operates both the switch 328 and the visual indicator 329 concurrently. As such, if the driving circuit 326 receives an indication of a fault from the nonvolatile memory, the driving circuit drives the switch open and concurrently drives the visual indicator to show the existence of the fault to a human operator. In embodiments where an electronic circuit indicator is used, the driving circuit deactivates the visual indicator when a reset signal is received by the input logic circuit. In embodiments where an electromechanical visual indicator is used, the visual indicator has to be manually reset by an operator.

The input logic circuit 322 can be implemented using a combination of devices such as logic gates. Filter elements and switches can also be included in the logic circuit 322. The nonvolatile memory element 324 can be implemented using a variety of one-bit nonvolatile memory elements. One embodiment of the present invention uses a potentiometer as the nonvolatile memory element 324. The potentiometer can be a digital potentiometer. The driving circuit 326 can be implemented using devices such as transistors and logic gates. The switch 328 can be implemented using devices such as transistors and filters. The visual indicator 329 can be implemented using a transistor or another type of switch that is coupled to a LED or an electromechanical pop-up indicator. Elements of the fault indicator circuit can include filter components for filtering out noise such as higher frequency currents. In several embodiments, components of the fault indicator circuit are implemented using an appropriately configured microprocessor, gate array or application specific integrated circuit (ASIC).

Figure 4:
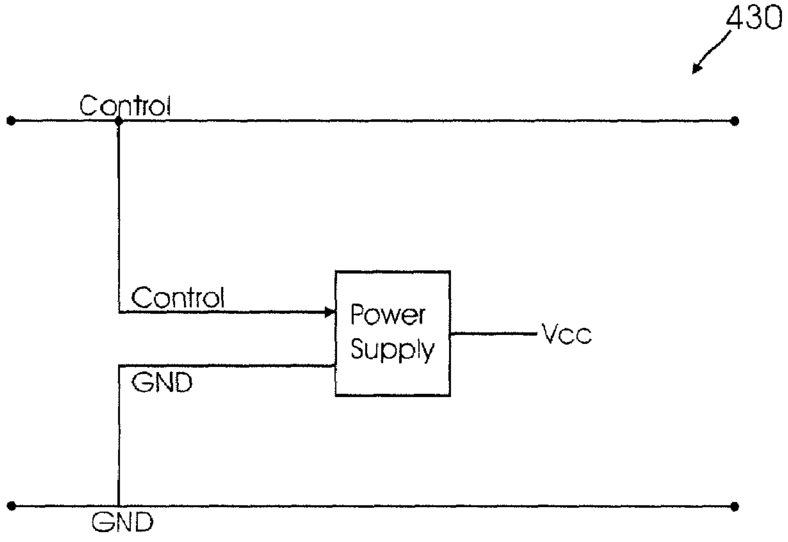
FIG. 4 is a schematic view of a power supply that can be used to provide power to the fault indicator circuit in accordance with an embodiment of the present invention.

FIG. 4 is a schematic view of a power supply 430 that can be used to provide power to the fault indicator circuit in accordance with an embodiment of the present invention. In the illustrated embodiment, the power supply 430 is coupled between a control line and a ground. The control line and the ground that are coupled to the power supply, are also coupled to other elements such as a fault indicator circuit. In many embodiments, at least one outgoing line from the power supply can be used to provide a voltage signal. In many embodiments, the power supply utilizes a portion of the current flowing in the control line and converts this current into stable voltage signals. The voltage signals generated by the power supply can be used to drive various components of the fault indicator circuit. In the illustrated embodiment, a supply voltage Vcc is generated by the power supply 430 that can be used by devices in the fault indicator circuit. In many embodiments, the value of Vcc is 5V. In other embodiments, other output voltage are provided. A power supply 430 in accordance with embodiments of the invention, can be implemented using any type of commercially available power supply or known power supply circuit configuration.

Figure 5:
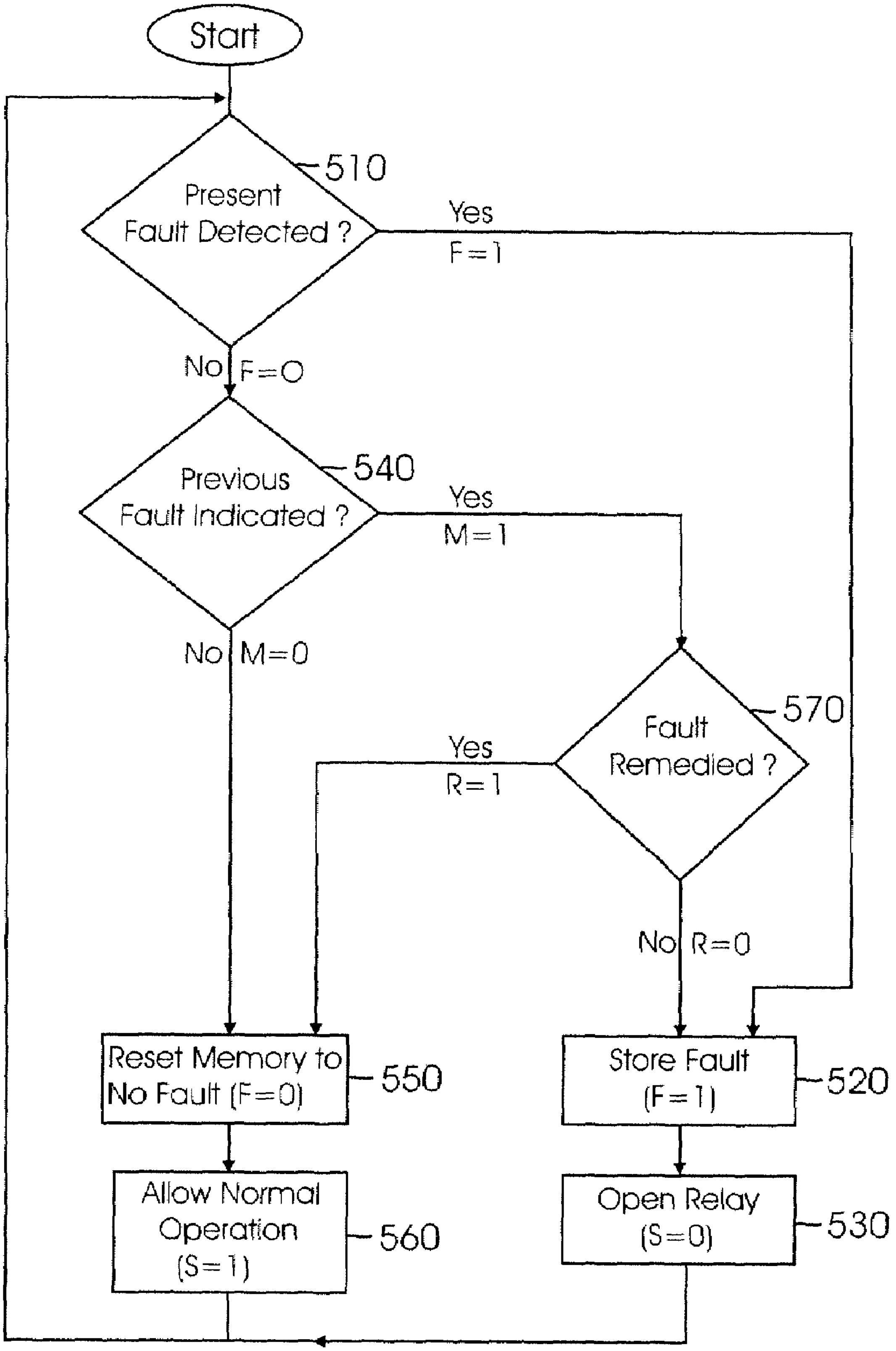
FIG. 5 is a flow chart showing a method of controlling the operation of a relay in response to the detection of a fault in accordance with an embodiment of the present invention.

FIG. 5 is a flow chart showing a method of controlling the operation of a relay in response to the detection of a fault in accordance with an embodiment of the present invention.

The method 500 includes determining (510) if a present fault has been detected. If a present fault has been detected, a memory of the existence of the fault is stored (520) and a relay is opened (530). If it is determined (510) that no present fault has been detected, then a determination (540) is made as to whether or not a previous fault existed. If no present fault is detected and no previous fault existed, then the memory is reset (or cleared) (550) and the relay is allowed (560) to perform normal operations.

If it is determined (540) that a previous fault existed, then a further determination (570) is made as to whether or not the previous fault had been remedied. If the fault had not been remedied (570), a memory of the existence of the fault is maintained (520) and the relay is opened (530). If, on the other hand, the fault is determined to have been remedied (570), then the memory is reset (550) and the relay is allowed to operate normally (560). To check continuously for fault or reset, after opening the relay (530) or allowing normal operation (560), the method loops back to determining (510) whether a present fault has been detected.

A decision table can be used to demonstrate the method of controlling the operation of a relay in accordance with the embodiment of the FIG. 5. Table 1, illustrated below, shows inputs and outputs to a fault indicator circuit in accordance with an embodiment of the invention. The input variables include the fault status, the current memory state, and the reset signal. The output variables include the next state of the memory, and the open or closed status of a switch that provides power to the relay. In Table 1, Fault=0 indicates no current fault and a Fault=1 indicates a fault; Memory=0 indicates no fault is stored and Memory=1 indicates a stored fault; Reset=0 indicates no current reset signal and Reset=1 indicates a request to reset a past fault; and Switch=0 is an open switch and Switch=1 indicates a closed switch.

TABLE 1

| Input Fault | Input Memory | Input Reset | Output Memory | Output Switch |
|---|---|---|---|---|
| 0 | 0 | 0 | 0 | 1 |
| 0 | 0 | 1 | 0 | 1 |
| 0 | 1 | 0 | 1 | 0 |
| 0 | 1 | 1 | 0 | 1 |
| 1 | 0 | 0 | 1 | 0 |
| 1 | 0 | 1 | 1 | 0 |
| 1 | 1 | 0 | 1 | 0 |
| 1 | 1 | 1 | 1 | 0 |

In the first two rows, there is no present fault and no memory of a past fault. Therefore, irrespective of the value of the reset variable, the next state of the memory does not change. In the illustrated table, the output of switch is an inverted version of the memory output. Thus, while the memory is clear, the switch will be closed and the relay will be permitted to convey power to the load. In the third row, there is no present fault but there is a stored fault and no reset. Therefore, the stored fault is maintained and the switch is open. In the fourth row, there is no present fault, a stored fault, and a reset request. Therefore, the memory is cleared to show a no-fault situation and the switch is closed. In the last four rows, a present fault is detected. Therefore, irrespective of the previous status of memory or reset, the memory will show the existence of a fault and the switch is opened.

Operations summarized in Table 1 can be implemented in accordance with the embodiments of the invention by using a logic circuit and a non-volatile memory element, where the logic circuit is used to combine the input signals indicating fault and reset to and provide the appropriate input to the memory element to maintain the fault status.

As discussed above, a fault detection circuit can be used to detect the presence of a fault in a relay device and a fault indicator circuit can be used to store the fault. A nonvolatile memory element can be used to maintain memory of a fault in the absence of power. One possible choice for a nonvolatile memory element is a potentiometer including a nonvolatile memory. The potentiometer can be a digital potentiometer. The resistance of a potentiometer can be varied in response to a control signal and stored within the potentiometer's nonvolatile memory. Existence of a fault can be set to correspond to one resistance value and absence of fault can be set to correspond to another resistance value. In other embodiments, other types of nonvolatile memory elements are used. In one embodiment, an EEPROM is used as a nonvolatile memory element.

A logic circuit can be used to provide appropriate inputs to a nonvolatile memory element in response to fault and reset inputs to the logic circuit. The nature of the logic circuit depends on the nature of the nonvolatile memory element. For example, if a potentiometer is used as the nonvolatile memory element, then the existence of a fault can generate an output from the logic circuit that pushes the potentiometer to a high resistance value. Receipt of a reset signal can cause the logic circuit to generate an output that sets the potentiometer to a low resistance valve.

Figure 6:
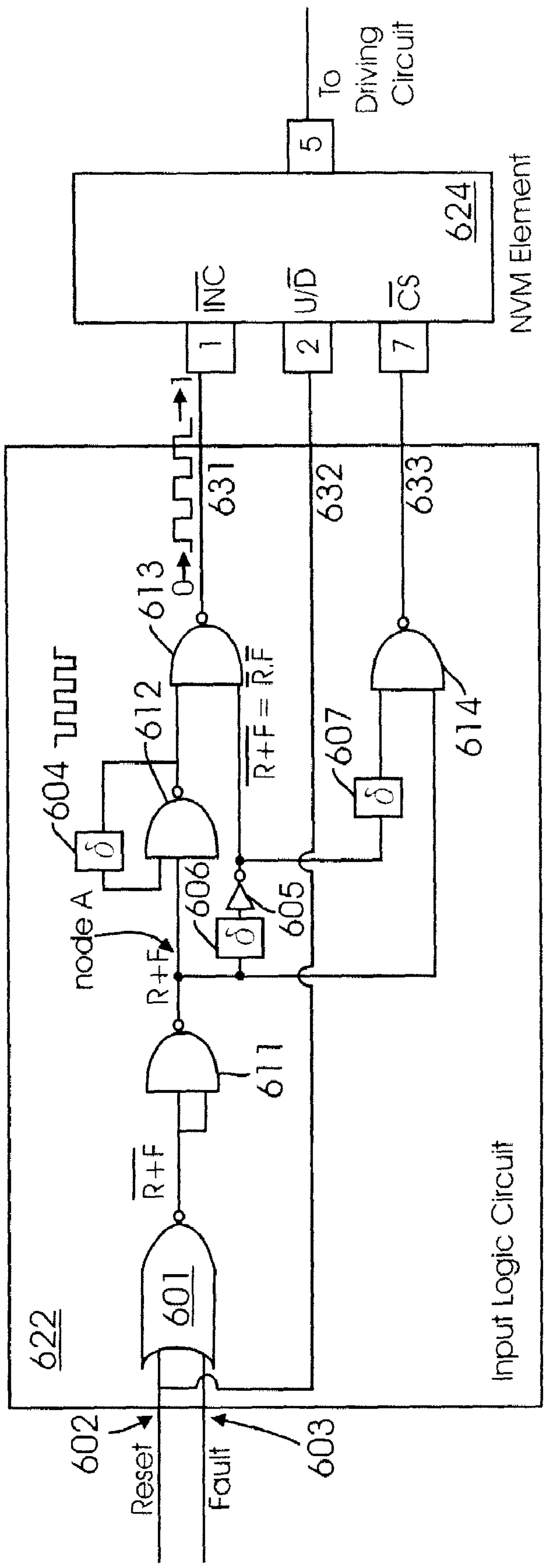
FIG. 6 is a schematic view of an input logic circuit and a nonvolatile memory that can be used in a fault indicator circuit in accordance with an embodiment of the present invention.

FIG. 6 is a schematic view of an input logic circuit 622 and a nonvolatile memory element 624 that can be used in a fault indicator circuit in accordance with an embodiment of the present invention. As discussed above, the nature of the input logic circuit 622 depends upon the nature of the nonvolatile memory element 624. In the illustrated embodiment, the nonvolatile memory element 624 is a digital potentiometer having a memory and a counter. The potentiometer has three inputs including signals indicating whether the potentiometer device is selected, (active low chip select whether the counter should count up (high) or down (low), and whether to increment the counter active low increment. The increment counter signal often appears as a "pulse train". The potentiometer can be changed only when the device is selected. Further, for every pulse in the pulse train, the counter will count up or down depending on the state of up/down signal. The memory maintains the counter value at the end of the pulse train. This value is stored until the device is selected again and another pulse train is received. In several embodiments, a high count is used to indicate a fault and a low count is used to indicate no fault.

In embodiments that use a potentiometer as a nonvolatile memory element 624, the logic circuit 622 is configured to respond to fault and reset input signals by generating inputs to the potentiometer that cause the potentiometer to store appropriate information. In the illustrated embodiment, the input logic circuit uses fault and reset inputs to generate a device select signal, a count up/down signal, and a pulse train. In other embodiments, the nonvolatile memory has different inputs and the input logic circuit generates appropriate signals to supply those inputs.

In the embodiment illustrated in FIG. 6, the nonvolatile memory element 624 is implemented using an Intersil™ X9315 digitally controlled potentiometer manufactured by Intersil Americas, Inc., of Milpitas, Calif. Specifications and principles of operation of this potentiometer are described in data sheet FN8179.1, dated Sep. 15, 2005, that is incorporated into the present application by reference. Intersil™ potentiometer also includes a counter and a nonvolatile memory. In addition, the Intersil™ potentiometer includes first, second, and third input terminals 1, 2, 7 and an output terminal 5. While not shown, the nonvolatile memory element 624 can also include terminals that are connected to Vcc and Vss operating voltages.

The Intersil™ potentiometer operates generally in the manner outlined above. An increment signal is provided at the input terminal 1, an up/down signal at the input terminal 2, and a device select signal at the input terminal 7. The increment signal controls the incrementing or decrementing of the digital potentiometer. The up/down signal indicates whether the resistance of the nonvolatile memory element should be increased, to indicate a fault, or be decreased to indicate no fault, or vice versa. The device select signal enables operation of the potentiometer. The value of the counter is stored in nonvolatile memory whenever the device is deselected. This occurs when the active low device select signal transitions to high and the increment signal is also high.

In the embodiment illustrated in FIG. 6, the input logic circuit 622 generates the inputs necessary to store and clear fault information using the Intersil™ X9315 digitally controlled potentiometer. The input logic circuit 622 includes two inputs (602, 603), three outputs (631, 632, 633), NOR gate 601, NAND gates (611, 612, 613, 614), inverter 605, and delay elements (604, 606, 607). Inputs 602 and 603 are coupled to the inputs of NOR gate 601 and to the reset and fault input signals, respectively. Input 602 is also coupled to output 632, which is coupled pin 2 (up/down input that counts down when low) of the digital potentiometer 624.

The output of NOR gate 601 is coupled to both inputs of NAND 611 (effectively acting as an inverter). The output of NAND 611 (node A) is coupled to one input of NAND 612. The output of NAND 612 is coupled to the second input of NAND 612 (i.e. feedback) via delay element 604 and to the first input of NAND 613. The output of NAND 613 is coupled to output 631 which is coupled to pin 1 (active low increment input) of digital potentiometer 624. Node A is also coupled to delay element 606 which is coupled to inverter 605. The output of inverter 605 is coupled to the second input of NAND 613 and to delay element 607. The output of delay element 607 is coupled to the first input of NAND 614. The node A is also coupled to the second input of NAND 614. The output of NAND 614 is coupled to output 633, which is coupled to pin 7 active low (chip or device select) of digital potentiometer 624.

In operation, node A is logical combination of the reset signal (R) and fault signal (F) inputs equivalent to "R+F" (i.e. R OR F). Assuming typical steady state operation, where neither the reset input nor the fault input is high, indicating no fault and no request for reset, "R+F" or node A is low. If node A is low, the output of NAND 612 will be a steady state high, and the output of inverter 605 will also be a steady state high. So during steady state operation as defined by an absence of a fault or reset (i.e. node A is low), the output of NAND 613 will be low along with output 631 and pin 1 (active low increment input) of digital potentiometer 624. In addition, during the steady state operation where node A is low, the output of NAND 614 is high along with output 633 and pin 7 (active low chip select input) of digital potentiometer 624. Thus, during the steady state operation where node A is low, the digital potentiometer device will not be selected and will not respond to changes in the increment input (pin 1) and up/down input (pin 2).

If the fault input transitions from low to high, indicating a current fault, node A transitions from low to high. Since the output of NAND 612 was previously high for steady state operation, the output of delay element 604 is high. Then the output of NAND 612 becomes low as both inputs are high. After a delay, the output of delay element 604 becomes low and consequently the output of NAND 612 becomes high again. Thus, after node A transitions from low to high, the output of NAND 612 oscillates with a frequency that depends on the duration of the delay provided by delay element 604. In one embodiment, the frequency of the oscillating output of NAND 612 (similar to a clock) is twice the duration of the delay of delay element 604. As node A transitions from low to high, the output of inverter 605 becomes low after the delay caused by delay element 606. Until the output of inverter 605 becomes low (i.e. during the delay caused by delay element 606), the output of NAND 613 (increment signal) becomes an inverted version of the oscillating output (clock) of NAND 612. Once the duration of the delay of delay element 606 has expired, the output of inverter 605 becomes low and consequently, the output of NAND 613 (increment signal) stays high.

Before node A transitions from low to high from the steady state, the output of delay element 607 is high and the output of NAND 614 is high. Thus, as soon as node A transitions from low to high, the output of NAND 614 becomes low and remains low for the duration of delays from both delay elements 606 and 607. At which time, the output of delay element 607 becomes low and thus the output of NAND 614 goes high again. Thus, when node A transitions from low to high, an active low pulse is provided by the output of NAND 614 as a chip or device select. The duration of the active low chip select pulse is determined by the addition of the delays caused by delay element 606 and delay element 607.

Figure 7:
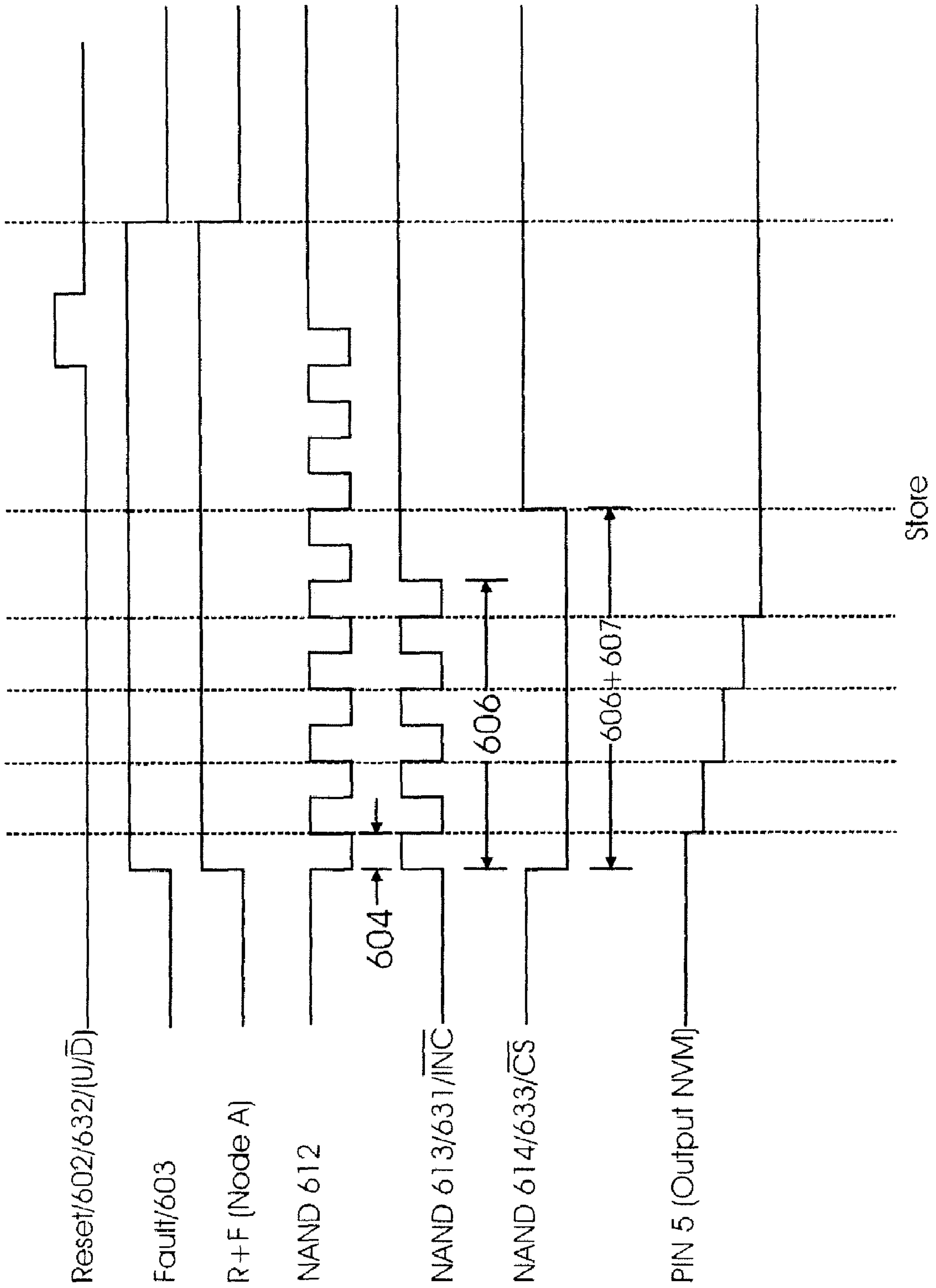
FIG. 7 is a timing diagram illustrating the operation of the input logic circuit and nonvolatile memory element of FIG. 6 to store a fault.

FIG. 7 illustrates a timing diagram indicative of the operation of the input logic circuit and nonvolatile memory element of FIG. 6 during a fault. From top to bottom the diagram illustrates inputs signals reset (602) and fault (603), node A (R+F), outputs of NAND gates 612, 613, 614, and the output of the digital potentiometer 624 at pin 5. As discussed above, for steady state operation where reset and fault are low, node A is low, the output of NAND 612 is high, the output of NAND 13 is low, and the output of NAND 14 is high. The output of the digital potentiometer (pin 5) is indicative of no fault, where the internal resistance of the potentiometer and corresponding output voltage at steady state is sufficiently high to supply the driving circuit 326 (see FIG. 3).

As the fault signal transitions from low to high, indicating a current fault, node A becomes high, NAND 612 begins oscillating with a period determined by delay element 604, NAND 13 (input to active low increment input of digital potentiometer 624) outputs an inverted version of NAND 612 for a duration determined by delay element 606, and NAND 614 (input to active low chip select input of digital potentiometer 624) becomes low for a duration determined by delay elements 606 and 607. In response, digital potentiometer 624 decreases internal resistance and corresponding output voltage at pin 5 on every falling edge of the increment signal while the chip select signal is low. The signal trace for pin 5 illustrated in FIG. 7 shows four such transitions resulting in decreasing output voltage.

The digital potentiometer 624 stores the value of the output voltage at pin 5, in effect by storing the resistance setting of the potentiometer, on the rising edge of the chip select signal while the increment signal is high such that the value is not lost when the digital potentiometer loses power. If a reset occurs subsequent to the occurrence of a fault, but before the fault has been cleared, the reset has no effect on the output of the digital potentiometer, as illustrated in FIG. 7. In several embodiments, the operation of the input logic circuit and nonvolatile memory are consistent with Table 1 shown above.

Figure 8:
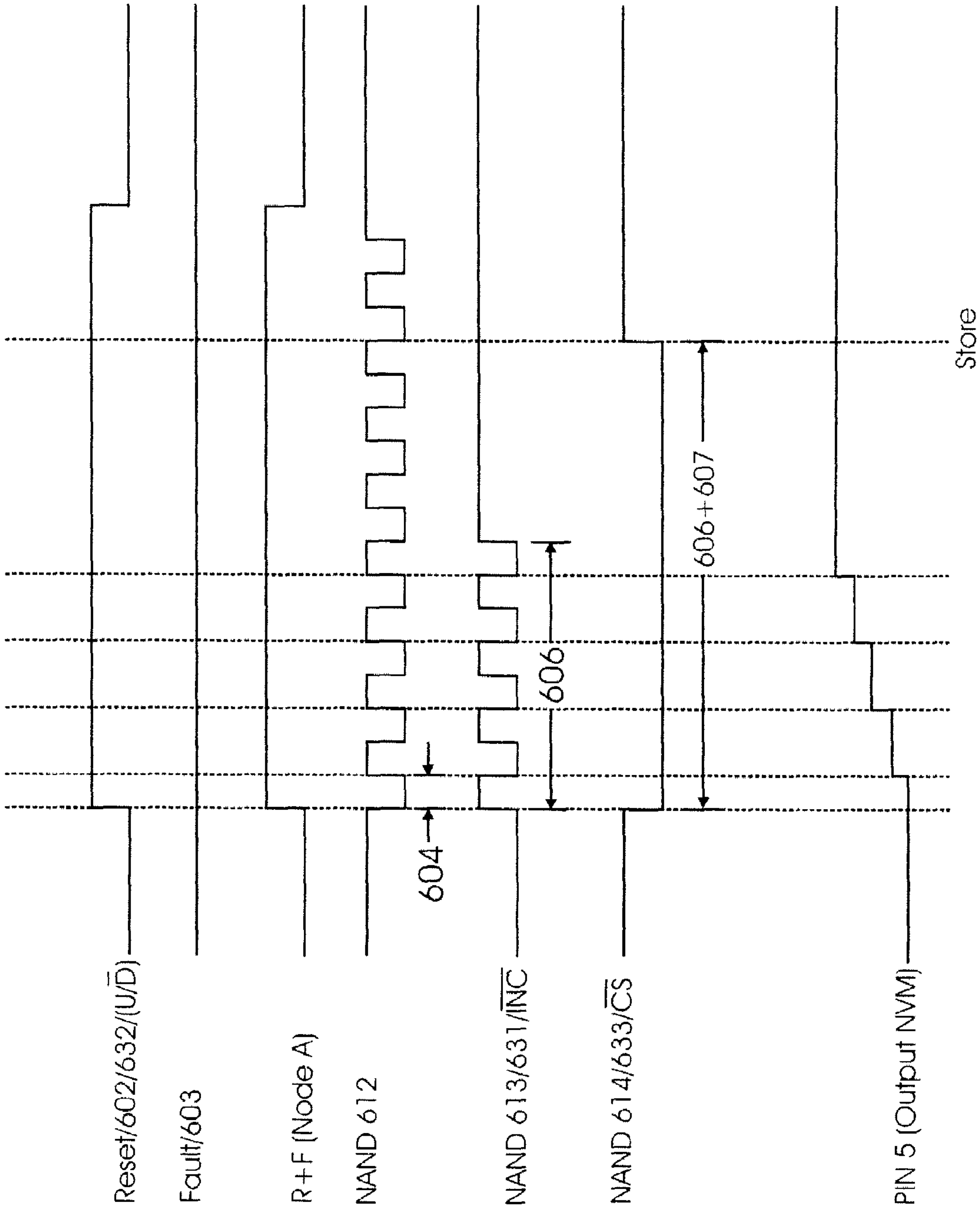
FIG. 8 is a timing diagram illustrating the operation of the input logic circuit and nonvolatile memory element of FIG. 6 to clear a stored fault.

FIG. 8 is a timing diagram illustrating the operation of the input logic circuit and nonvolatile memory element of FIG. 6 to clear a fault in response to a reset. From top to bottom the diagram illustrates inputs signals reset (602) and fault (603), node A (R+F), outputs of NAND gates 612, 613, 614, and the output of the digital potentiometer 624 at pin 5. As discussed above, for steady state operation where reset and fault are low, node A is low, the output of NAND 612 is high, the output of NAND 13 is low, and the output of NAND 14 is high. The output of the digital potentiometer (pin 5) is indicative of a prior fault, where the internal resistance of the potentiometer and corresponding output voltage at steady state is low compared to the initial default position (see FIG. 7).

As the reset signal transitions from low to high, indicating a request to clear the fault, the input logic circuit functions as described above for FIG. 7 indicating a fault except that the up/down signal (reset) instructs the digital potentiometer to increase the output voltage at pin 5 as illustrated. The digital potentiometer 624 again stores the value of the output voltage at pin 5, in effect by storing the resistance setting of the potentiometer, on the rising edge of the chip select signal while the increment signal is high. Here, the digital potentiometer is storing a high value indicating no fault, effectively having cleared the existing fault.

In several embodiments, the duration of delay element 606 is set such that a predetermined integer number of oscillations are delivered to the active low increment input of digital potentiometer 624. In one embodiment, the predetermined integer number of oscillations is equal to or exceeds a maximum counter value for the digital potentiometer. In one embodiment, oscillations created by delay element 604 occur at a frequency of 71 KHz, the period of delay for delay element 606 is 10 ms, and the period of delay for delay element 607 is 0.1 ms.

The various logic gates used in the input logic circuit 622 can be implemented commercially available NOR, NAND, and NOT gates. The NOR gate can be implemented using a Philips Semiconductor™ 74LVC1G57 low power configurable multiple function gate manufactured by Philips Semiconductor, Inc., of Washington, D.C. The NAND gates can be implemented using a Texas Instrument™ SN74LVC2G132, dual 2-input NAND gate with Schmitt-Trigger inputs, manufactured by Texas Instruments, Inc., of Dallas, Tex. The NOT gate can be implemented using a Philips Semiconductor™ 74LVC3G14 triple inverting Schmitt trigger with 5V tolerant input. The period of delay for delay element 604 can be generated using an RC circuit of 20 KΩ of resistance and 500 pF of capacitance. The delay for delay element 606 can be implemented using an RC circuit of 49.9 KΩ of resistance and 0.1 μF of capacitance at 10V. The delay for delay element 607 can be implemented using an RC circuit of 100 KΩ of resistance and 0.01 μF of capacitance at 10V.

In the embodiment illustrated in FIG. 6, an input logic circuit having reset and fault input signals works in conjunction with a digital potentiometer to store and clear fault conditions. In other embodiments, other digital potentiometers or conventional non-digital potentiometers having memory can be used. In one embodiments, an input logic circuit can be used in conjunction with an EEPROM or other nonvolatile memory device. In one embodiment, a flip-flop type component can be used as the nonvolatile memory element in conjunction with a suitable input logic circuit. In one embodiment, the flip-flop type or one bit non-volatile memory component is implemented in an ASIC. In another embodiment, the flip-flop type component is implemented in a programmable logic device. In another embodiment, both the input logic circuit and flip-flop type component are implemented using a programmable logic device (i.e. PLD, CPLD, FPGA) and/or an ASIC.

Figure 9:
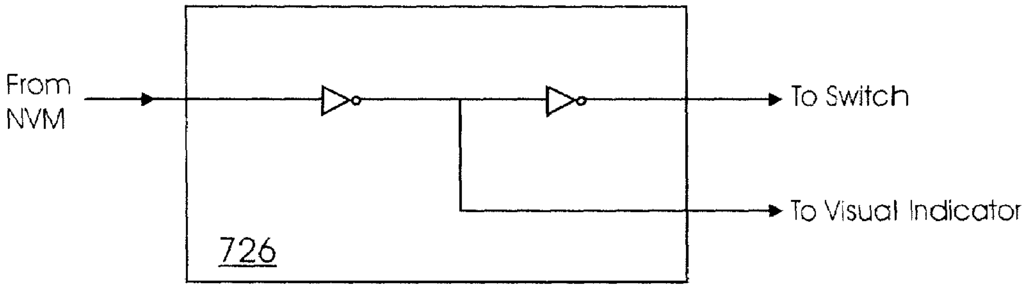
FIG. 9 is a schematic view of a driving circuit for use in a fault indicator circuit in accordance with an embodiment of the present invention.

FIG. 9 is a schematic view of a driving circuit 726 for use in a fault indicator circuit in accordance with an embodiment of the present invention. The driving circuit 726 includes two inverters that are coupled together in series. The driving circuit 726 includes one input and two outputs. The input provides a low or a high signal to the driving circuit 726. The low signal can be used to communicate the absence of a fault and the high signal can be used to communicate the presence of a fault or vice versa. In the embodiment shown, the input signal and an inverted version of the input signal are provided as output signals to both the switch 328 and visual indicator 329. In one embodiment, the inverters are Philips Semiconductor™ 74LVC3G14 triple inverting Schmitt trigger inverters with 5V tolerant inputs. In another embodiment, NAND gates configured as inverters can be used. In another embodiment, other suitable inverters can be used.

Figure 10:
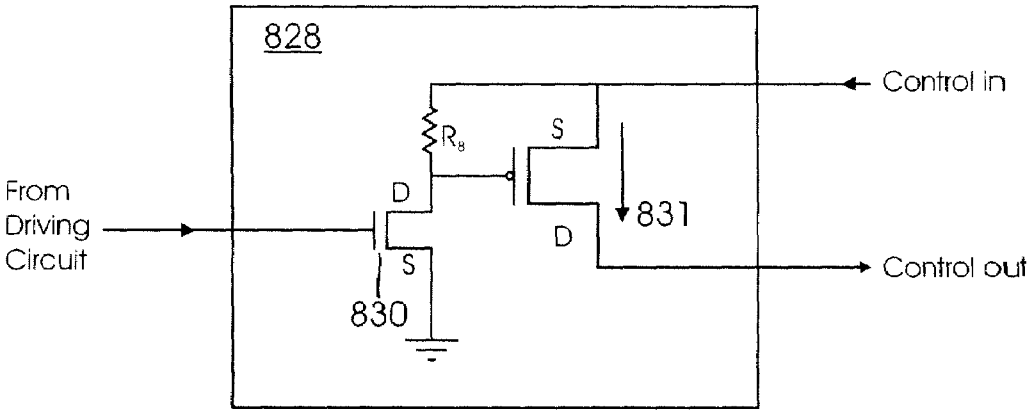
FIG. 10 is a schematic view of a relay control switch for use in a fault indicator circuit in accordance with an embodiment of the present invention.

FIG. 10 is a schematic view of a relay control switch 828 for use in a fault indicator circuit in accordance with an embodiment of the present invention. The relay control switch 828 includes an NMOS transistor 830 and a PMOS transistor 831 coupled together in a drain to gate configuration. A resistor R8 couples the drain of the NMOS transistor 830 to the source of the PMOS transistor 831. Other components such as additional resistors and filter components can be included in other embodiments. The relay control switch 828 includes two input terminals and one output terminal. The first input signal corresponds to the on/off signal provided by the driving circuit. The first input signal is provided to the gate of the transistor 830 and can turn transistor 830 off or on. When transistor 830 is on, the drain current of the transistor 830 provides suitable switching voltage to the gate of the second transistor 831 which turns the second transistor on or off.

The second input signal can be an external control signal that can be used to control a relay. When transistor 831 is on, the external control signal is received at the source of transistor 831. When the second transistor 831 is on, it closes a circuit carrying a current corresponding to the external control signal from the control input to the control output of the relay control switch 828. The control input signal also provides drain voltage for transistor 830.

The relay control switch can be implemented using a different arrangement of NMOS transistors or PMOS transistors. In other embodiments, electromechanical switches can be used instead of transistors. In several embodiments, the first transistor is implemented using a Fairchild Semiconductor™ 2N7002 N-channel enhancement mode FET DMOS transistor manufactured by Fairchild Semiconductor, Inc., of South Portland, Me., and the second transistor is a Philips Semiconductor™ BSH 202 P-channel enhancement mode MOS transistor.

Figure 11:
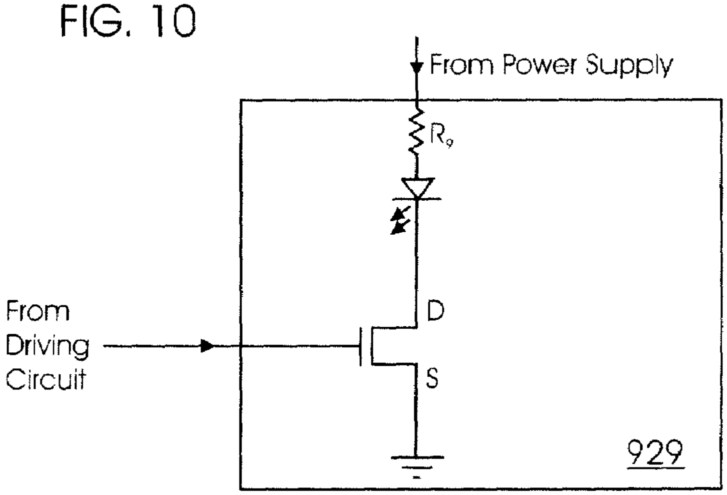
FIG. 11 is a schematic view of a visual indicator for use in a fault indicator circuit in accordance with an embodiment of the present invention.

FIG. 11 is a schematic view of a visual indicator circuit 929 that includes an electronic visual indicator for use in a fault indicator circuit in accordance with an embodiment of the present invention. The visual indicator circuit 929 includes an NMOS transistor coupled to a light emitting diode (LED). The drain of the NMOS transistor is coupled to a cathode electrode of the LED. The source of the NMOS is grounded. An anode electrode of the LED is coupled to a power supply. A resistor R9 is coupled between the power supply and the anode electrode of the LED. In other embodiments, a PMOS transistor can be used instead with the source coupled to the LED. Another type of switch can also be used instead of the NMOS transistor. In other embodiments, the visual indicator circuit can include other components such as resistors or filters.

An input signal from the driving circuit is provided to the visual indicator at the gate of the transistor. In the illustrated embodiment, a high input signal turns the NMOS transistor on. When the transistor is on, it allows current from the power supply to flow through the LED which emits light. The LED provides a visual indication of a fault.

The switch used in the visual indicator can be implemented using NMOS transistors, PMOS transistors, or electromechanical switches. For example, the transistor can be implemented as a Fairchild Semiconductor™ 2N7002 N-channel enhancement mode FET DMOS transistor or a Philips Semiconductor™ BSH 202 P-channel enhancement mode MOS transistor. In another embodiment, other types of switches suitable to drive the LED are used.

Figure 12:
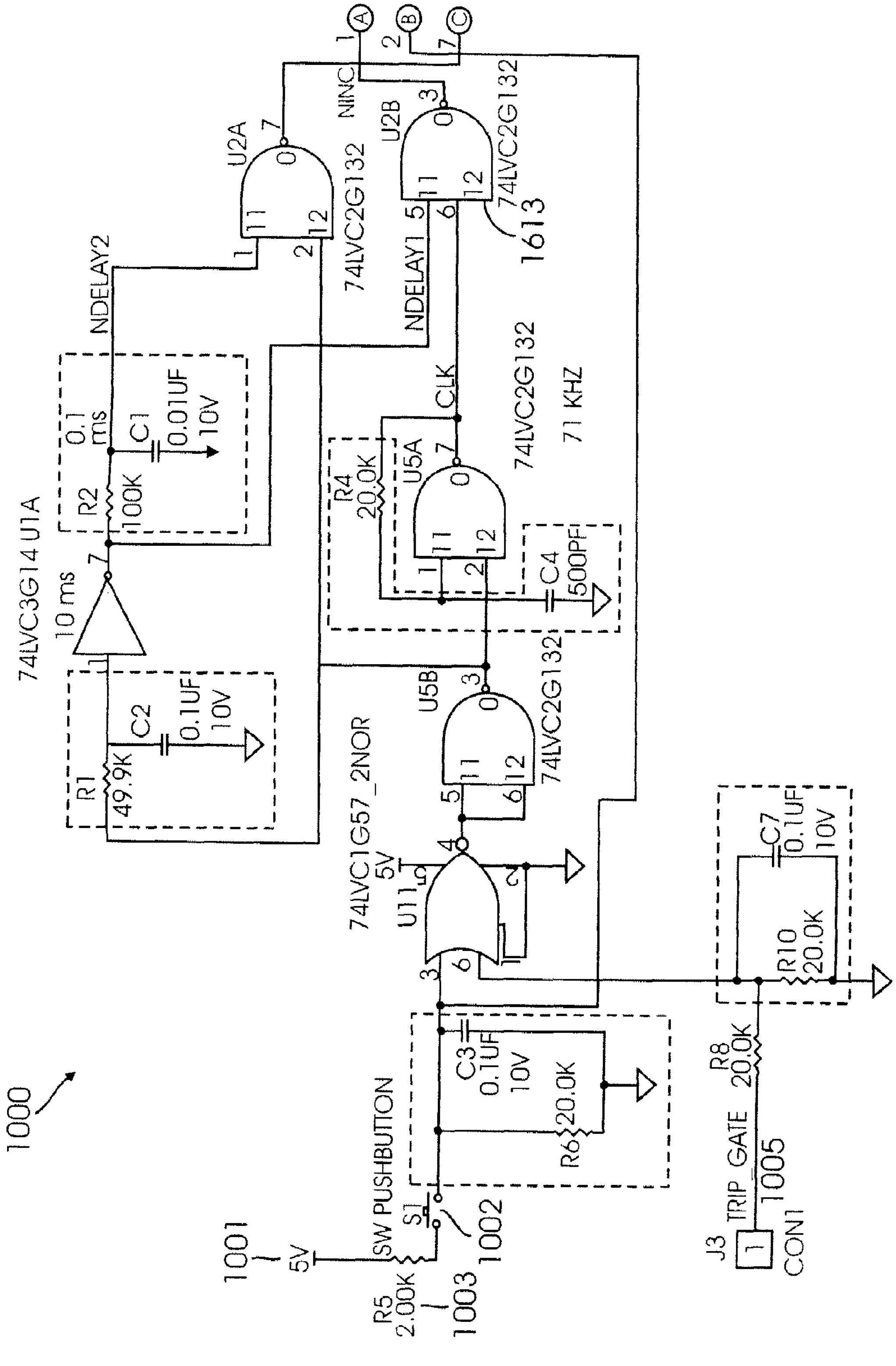
FIG. 12 is a circuit diagram of a fault indicator circuit in accordance with an embodiment of the present invention.
Figure 12:
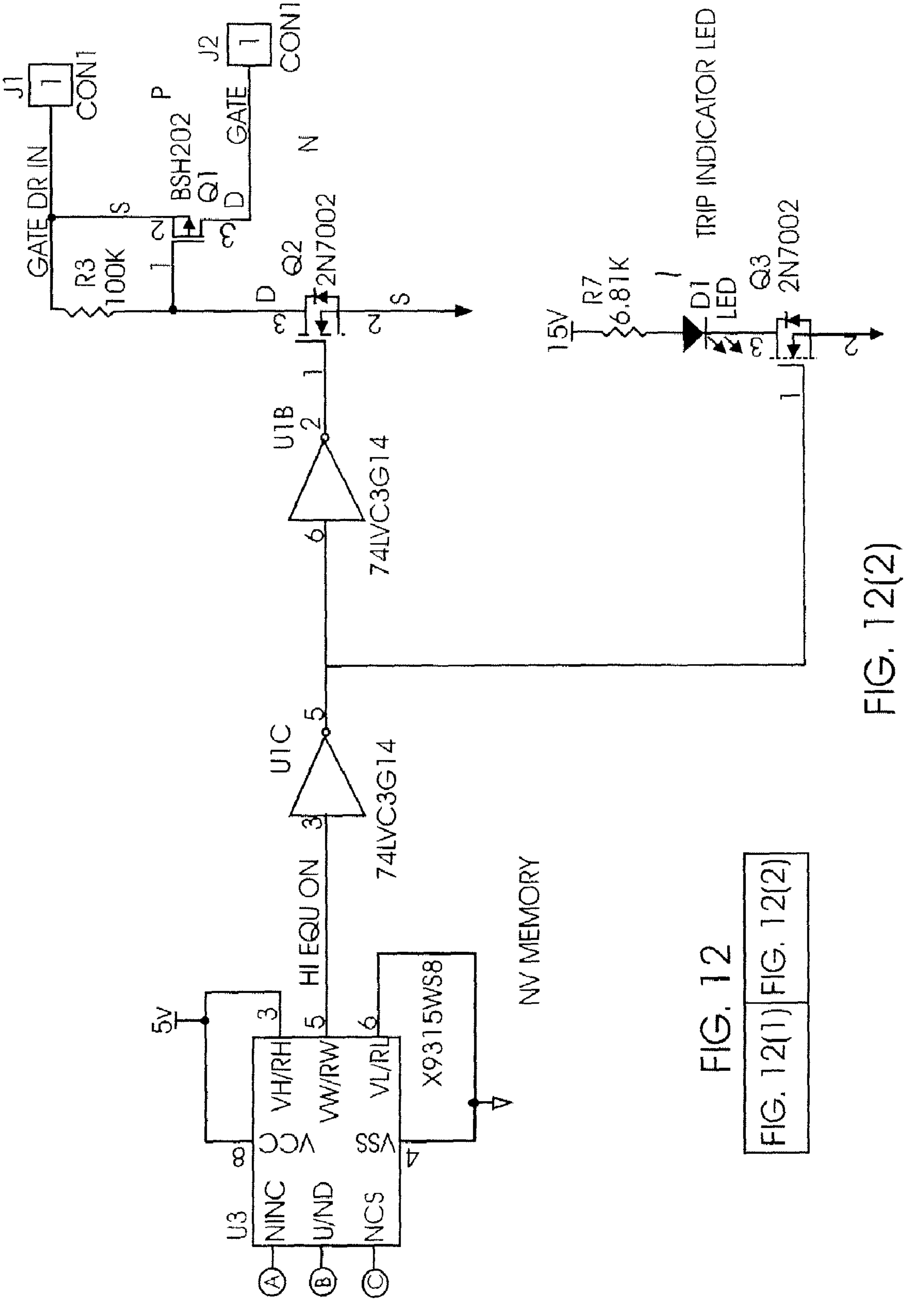

FIG. 12 is a circuit diagram of a fault indicator circuit 1000 in accordance with an embodiment of the present invention. The fault indicator circuit 1000 includes sub-circuits that correspond to the input logic circuit and nonvolatile memory element of FIG. 6, the driving circuit of FIG. 7, the relay control switch of FIG. 8, and the visual indicator of FIG. 9. These sub-circuits can operate as described above for each respective sub-circuit.

A number of parallel RC filters are included that filter the high frequency part of input signals and prevent it from interacting with the remainder of the fault indicator circuit 1000. A number of series RC components are used as delay elements.

A reset switch 1002 provides a reset signal to the fault indicator circuit 1000 when the switch is closed. The reset signal is provided by a high voltage level from the power supply 1001. In the embodiment shown, the power supply provides 5V to the fault indicator circuit 1000 input when the reset switch 1002 is closed. The input 1005 provides a fault signal to the fault indicator circuit 1000. The fault signal can be generated anywhere in the electrical system of the airplane and is provided to the fault indicator circuit 1000 via the input 1005.

Figure 13:
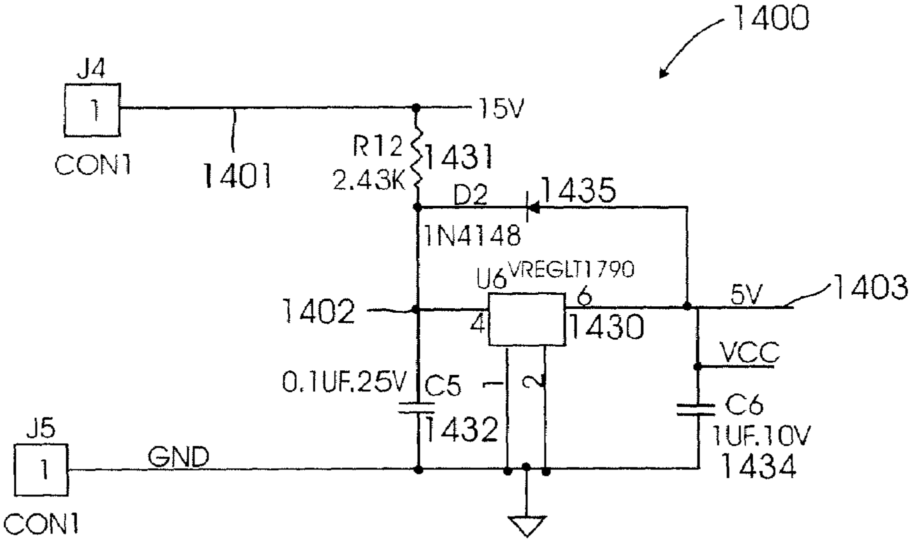
FIG. 13 is a circuit diagram of a power supply assembly for use with a fault indicator circuit in accordance with an embodiment of the present invention.

FIG. 13 is a circuit diagram of a power supply assembly 1400 that can be used to provide power to a fault indicator circuit in accordance with an embodiment of the present invention.

The power supply assembly 1400 includes a control line 1401 coupled to a power supply 1430 through a resistor 1431. The power supply 1430 is grounded through a first bypass capacitor 1432, that is coupled to an input 1402 of the power supply 1430, and through a second bypass capacitor 1434 that is coupled to an output 1403 of the power supply 1430. The power supply 1430 has two other terminals that are both also grounded. A diode 1435 is coupled across the input 1402 and output 1403 terminals of the power supply 1435. The power supply assembly 1400, as a whole, receives one input from a control line 1401 and is also connected to a ground. The power supply assembly 1400 has one output 1403.

The power supply 1430 receives a small amount of current from the control line 1401 and provides a stable supply of power, through its output 1403, to various elements of the fault indicator circuit 1000. The diode 1435 prevents direct current flow from the control line 1401 to the output 1403 of the power supply but permits a reverse flow of current. The first and second bypass capacitors 1432, 1434 filter out the high frequency components of the current and voltage to prevent damage to the power supply 1430. In one embodiment, the control line 1401 carries 15V and the power supply assembly 1430 uses current sufficient to generate a stable supply voltage of 5V at the output 1403. The supply voltage can be provided as the Vcc signal to various transistors and other components of the fault indicator circuit 1000. In alternative embodiments, the control line can provide an AC voltage and the power supply would be configured accordingly.

In one embodiment, a micro-power small outline transistor (SOT) is used to implement power supply 1430. In one embodiment, Linear Technology™ LT1790 micropower SOT-23 low dropout reference power supply, manufactured by Linear Technology, Inc., of Milpitas, Calif., is used. The diode can be implemented using a high conductance fast diode for example 1N4148 from Fairchild Semiconductor™. The first bypass capacitor 1432, at the input, can be implemented using a 0.1 μF capacitor (25 V). The second bypass capacitor 1434, at the output, can be implemented using a 1 μF capacitor (10 V). The resistor can be a 2.43 KΩ resistor.

Figure 14:
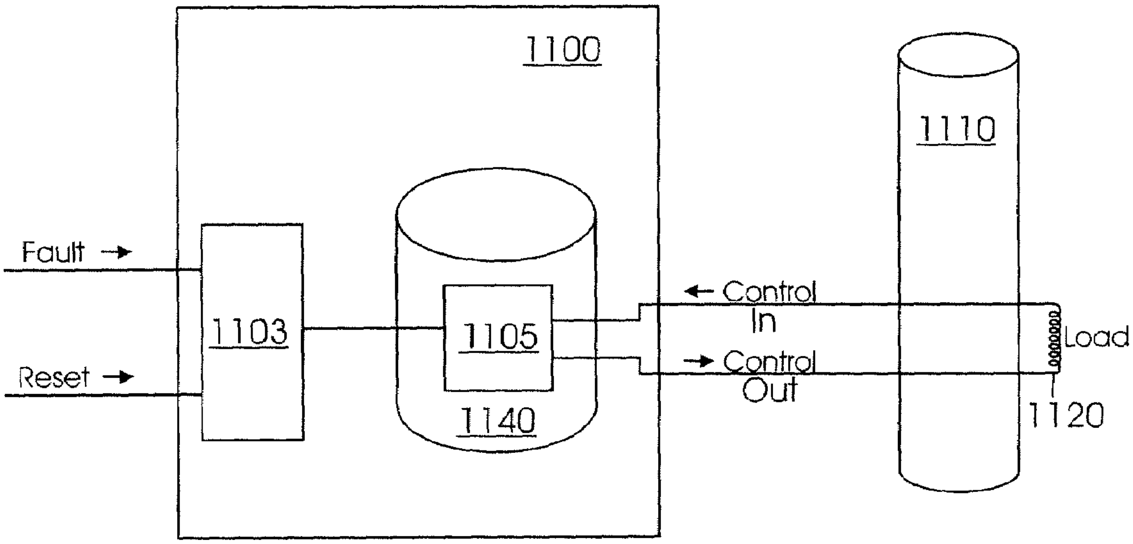
FIG. 14 is a schematic block diagram of a fault indicator circuit including an electromechanical switch with electromagnetic shielding in accordance with an embodiment of the present invention.

FIG. 14 is a schematic view of a fault indicator circuit including electromagnetic shielding in accordance with an embodiment of the present invention. The fault indicator circuit 1100 is coupled to the coil of a relay 1110 that is in turn coupled to a load 1120. The fault indicator circuit 1100 includes an input logic circuit 1103, an electromechanical switch 1105 and an electromagnetic shield 1140.

The fault indicator circuit 1100 receives a fault signal and a control-in signal and generates a control-out signal. The input logic circuit 1103 receives the fault signal and the reset signal and controls the electromechanical switch 1105 within the fault indicator circuit 1100. The input logic circuit trips the electromechanical switch 1105 when the fault signal indicates the existence of a fault. In response, the electromechanical switch 105 opens the current loop that provides current to the relay 1110. The electromechanical switch acts as a non-volatile memory and maintains the memory of this fault by maintaining the state of the fault indicator circuit until it is reset. The reset signal or stimulus is also provided to the fault indicator circuit 1100. The electromechanical switch controls the relay by interrupting (i.e. disconnecting) the external control signal that controls the relay when appropriate. Reset of the fault indicator circuit 1100 clears the fault and instructs the electromechanical switch 1105 to allow the control signal to pass through. The reset signal clears a past fault while the fault signal indicates a present fault. In a number of embodiments, the reset signal is provided by a switch. In a number of embodiments, the switch is part of a pop-up fault indicator. In other embodiments, the switch is separate from any fault indicating circuitry.

Electromechanical switches can be inadvertently tripped as influenced by electromagnetic fields such as those generated by the relay coil. The electromagnetic shield 1140, in accordance with the embodiments of the invention, reduces the potential for electromagnetic fields to interfere with the operation of the electromechanical switch inside the fault indicator circuit 1100.

The fault indicator circuit 1100 and the relay 1110 can be implemented using a variety of commercially available products. The electromagnetic shield 1140 can be implemented using any type of material that interacts with and absorbs or disrupts the electromagnetic field. In one embodiment, metallic material is used for the electromagnetic shield.

In some embodiments, magnetic shields are formed utilizing ferrous alloys which have high magnetic permeability. Some examples of these materials include cold rolled steel, low carbon steel, electric Iron, mild steel, silicon steel (SiFe), HyMu alloy referring to a generic class of alloys that have high magnetic permeability levels (mu). Examples of some materials that can be used for implementing the magnetic shields include Supermalloy, Hymu 800, Silectron Z, Supermendur, Permalloy, Hy-Ra 80, Orthanol, Deltamax, Hypemik, and Mu-metal.

The electromechanical switch 1105 can be implemented using a Reed switch or a Reed relay. The Reed switch is an electrical switch that is operated by applying a magnetic field. The magnetic field can be applied using a permanent magnet or by an electromagnet. One type of Reed switch includes a pair of contacts made from magnetic material in a hermetically sealed glass envelope. The contacts can be normally open, which close when a magnetic field is present, or normally closed, which open when a magnetic field is applied. The Reed relay typically includes one or more Reed switches that are controlled by an electromagnet.

Reed switches and Reed relays are formed such that they can be tripped using a magnetic field and do not need an actual mechanical or electrical triggering. The Reed switch is intended to be operated by its corresponding electromagnet. However, Reed switches are vulnerable to parasitic magnetic fields that can be present in the atmosphere around the switch. Depending on the sensitivity of the Reed switch, various magnetic fields in the vicinity can interfere with the Reed switch and trip it when it is not intended to be tripped by the operating logic circuit.

One important quality of the electromechanical switch is its sensitivity, which is the amount of magnetic energy necessary to actuate the switch. For example, when an electromechanical switch is actuated using a coil electromagnet, sensitivity is measured in units of Ampere-turns, corresponding to the current in the coil multiplied by the number of turns. The electromagnetic shield used to protect the electromechanical switch from unintended tripping is selected to match the sensitivity of the electromechanical switch. For example, a Reed switch with low sensitivity requires a high magnetic field in order to be actuated, can be protected with a thin sheet of ferrous material. By the same token, a highly sensitive Reed switch, that is easily tripped, requires a thicker shield that does not let through even small portions of the parasitic electromagnetic fields.

Figure 15A:
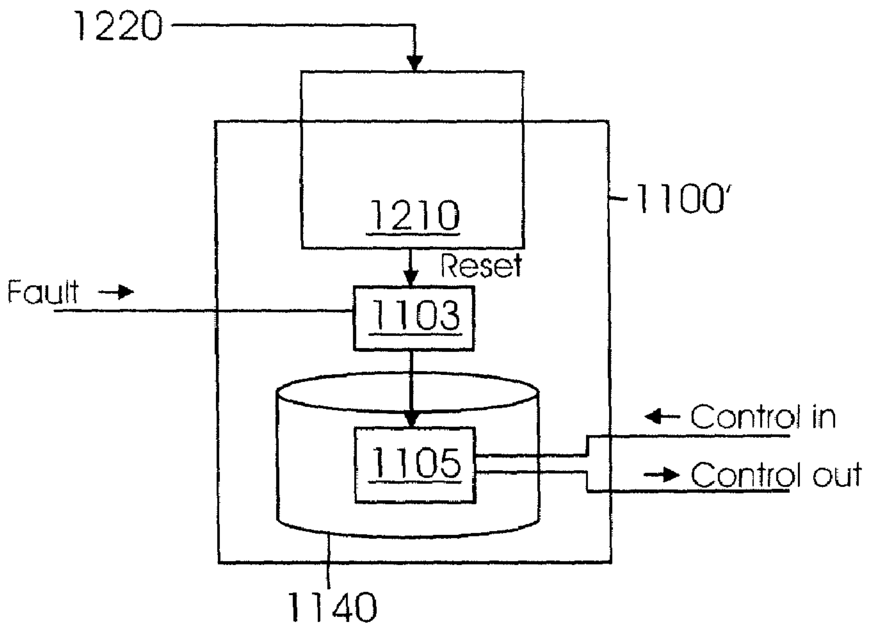
FIG. 15A is a schematic block diagram of a fault indicator circuit including a visual indicator indicating a non-fault condition in accordance with an embodiment of the present invention.

Once a fault has been cleared, a reset stimulus is provided to the fault indicator circuit. FIG. 15*a* illustrates a visual indicator and a manual reset mechanism to be used with a fault indicator circuit 1100'. The fault indicator circuit 1100' includes a pop-up indicator 1210 that can be a pop-up button. The fault signal trips the electromechanical switch 1105' within the fault indicator circuit 1100'. The electromechanical switch opens the current loop and pushes up the pop-up indicator 1210 from position 1220 to position 1230 (see FIG. 15B). The pop-up indicator 1210 of the electromechanical switch effectively maintains the memory of this fault in the up position (1230). Once the fault has been cleared, pushing down the pop-up indicator from up-position 1230 back to down-position 1220 resets the fault indicator circuit 1100' and enables the electromechanical switch 1105' to pass the control signal to the relay.

Figure 15B:
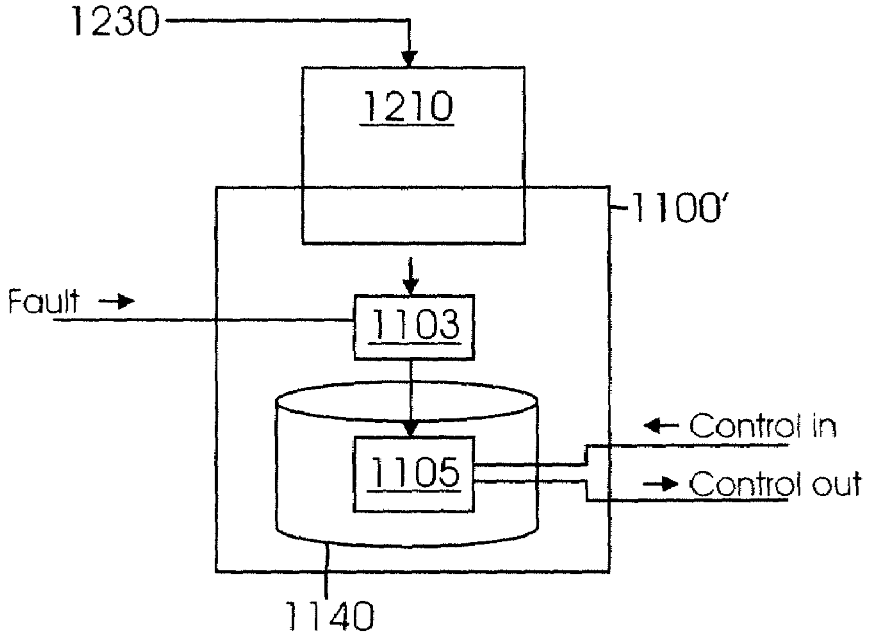
FIG. 15B is a schematic block diagram of a fault indicator circuit including a visual indicator indicating a fault condition in accordance with an embodiment of the present invention.

In the embodiments of FIG. 15A and FIG. 15B, the pop-up indicator pops up in response to a fault and provides a visual indication of the fault while also serving as a nonvolatile memory of the fault until reset. In the illustrated embodiments, the fault indicator circuit is manually reset when the pop-up indicator is pushed down. In other embodiments, the electromechanical switch can be manually reset using a different manual reset mechanism.

Although the present invention has been described with reference to certain exemplary embodiments, it is understood that a variety of modifications and variations can be made to the present invention without departing from the spirit or scope of the invention defined in the appended claims, and their equivalents.

What is claimed is:

1. An aircraft electrical system comprising:

a fault detection circuit coupled to a relay; and a fault indicator circuit coupled to the fault detection circuit and to a control input of the relay;

wherein the fault indicator circuit includes a nonvolatile memory element comprising a potentiometer having a nonvolatile memory;

wherein the fault detection circuit is configured to detect a fault and to provide a signal indicative of the fault to the fault indicator circuit; and wherein the fault indicator circuit is configured to respond to the signal indicative of the fault by providing a predetermined control signal to the relay and by storing information indicative of the detection of the fault in the nonvolatile memory of the potentiometer.

2. The aircraft electrical system of claim 1, wherein the fault indicator circuit is configured to receive a reset signal and to clear the nonvolatile memory element based on the reset signal.

3. The aircraft electrical system of claim 1, wherein the fault indicator circuit is configured to:

receive an external control signal;

allow the external control signal to pass through the fault indicator circuit to the control input of the relay when the nonvolatile memory element does not contain information indicative of the detection of a fault; and prevent the external control signal from passing to the control input of the relay when the nonvolatile memory element contains information indicative of the detection of a fault.

4. The aircraft electrical system of claim 1, wherein the fault indicator circuit includes:

an input logic circuit configured to receive the signal indicative of a fault and to receive a signal indicative of a request to reset the nonvolatile memory element; and a switch coupled to an output of the input logic circuit, the switch configured to prevent flow of the control signal to the relay when the nonvolatile memory element contains information indicative of the detection of a fault.

5. The aircraft electrical system of claim 4, wherein the switch includes at least one transistor.

6. The aircraft electrical system of claim 4, wherein the switch is an electromechanical switch.

7. The fault indicator circuit of claim 4, wherein the input logic circuit is configured to generate a first output signal indicating the existence of a fault, where the first output signal is derived from the reset signal and the fault signal.

8. The fault indicator circuit of claim 4, wherein the input logic circuit and the nonvolatile memory element are implemented in at least one of a programmable logic device and an ASIC.

9. The aircraft electrical system of claim 1, wherein the fault indicator circuit further includes a visual indicator for providing a visual indication of a stored fault.

10. The aircraft electrical system of claim 9, wherein the visual indicator includes at least one LED.

11. The aircraft electrical system of claim 9, wherein the visual indicator is a pop-up button.

12. The aircraft electrical system of claim 11, wherein the fault indicator circuit further includes a manual reset mechanism configured to receive a resetting stimulus and to generate the reset request signal responsive to the resetting stimulus; and wherein the pop-up button provides the resetting stimulus when it is pushed down.

13. The aircraft electrical system of claim 1, wherein the relay controls the flow of current from a power source to a load.

14. The fault indicator circuit of claim 1, wherein the potentiometer is a digital potentiometer having at least one high resistance position and at least one low resistance position, wherein the fault indicator circuit is configured to store a fault as one of the at least one high resistance position and the at least one low resistance position.

15. The fault indicator circuit of claim 1, wherein the nonvolatile memory element includes a one-bit memory element.

16. A method for controlling a relay in an airplane electrical system, the method comprising:

detecting at least one fault;

storing a record of the at least one fault using a potentiometer comprising a solid state nonvolatile memory;

maintaining the record of the at least one fault in the absence of power;

clearing the record of the at least one fault when a reset signal is received; and opening a relay to stop a flow of current to a load in the airplane electrical system when the at least one fault is stored.

17. A fault indicator circuit comprising:

an input logic circuit configured to receive a fault signal indicative of a detection of a fault and a reset signal indicative of a request to reset the fault; and an electromechanical switch coupled to an output of the input logic circuit, where the output of the input logic circuit is derived from the fault signal and the reset signal;

wherein the electromechanical switch is configured to control a relay in response to the output of the input logic circuit; and wherein an exterior housing of the electromechanical switch is surrounded by a shielding material that reduces an impact of external magnetic fields on operation of the electromechanical switch.

18. The fault indicator circuit of claim 17, wherein the electromechanical switch is a Reed switch.

19. The fault indicator circuit of claim 17, wherein a shielding capability of the shielding material is greater than a magnetic sensitivity of the electromechanical switch.

20. The fault indicator circuit of claim 17, wherein the shield is comprise of a magnetic ferrous material.

* * * * *

UNITED STATES PATENT AND TRADEMARK OFFICE

CERTIFICATE OF CORRECTION

PATENT NO. : 7,738,230 B2
APPLICATION NO. : 11/969861
DATED : June 15, 2010
INVENTOR(S) : Robert C. Mallon et al.

It is certified that error appears in the above-identified patent and that said Letters Patent is hereby corrected as shown below:

<u>In the Claims</u>

Column 18, Claim 20, line 32 Delete "comprise" Insert -- comprised --

Signed and Sealed this
Fifteenth Day of February, 2011

David J. Kappos

David J. Kappos
*Director of the United States Patent and Trademark Office*